US009824792B2

United States Patent
Nakashima et al.

(10) Patent No.: US 9,824,792 B2
(45) Date of Patent: Nov. 21, 2017

(54) WIRE HARNESS

(71) Applicants: AutoNetworks Technologies, Ltd., Yokkaichi, Mie (JP); Sumitomo Wiring Systems, Ltd., Yokkaichi, Mie (JP); Sumitomo Electric Industries, Ltd., Osaka, Osaka (JP); Kyushu University, Fukuoka, Fukuoka (JP)

(72) Inventors: Kazuo Nakashima, Mie (JP); Takehiro Hosokawa, Mie (JP); Tatsuya Hase, Mie (JP); Kenji Ito, Mie (JP); Makoto Mizoguchi, Fukuoka (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-shi, Osaka (JP); Kyushu University, Fukuoka-shi, Fukuoka (JP)

( * ) Notice: Subject to any disclaimer, the term of this patent is extended or adjusted under 35 U.S.C. 154(b) by 0 days.

(21) Appl. No.: 15/518,750

(22) PCT Filed: Oct. 9, 2015

(86) PCT No.: PCT/JP2015/078709
§ 371 (c)(1),
(2) Date: Apr. 12, 2017

(87) PCT Pub. No.: WO2016/067891
PCT Pub. Date: May 6, 2016

(65) Prior Publication Data
US 2017/0243673 A1 Aug. 24, 2017

(30) Foreign Application Priority Data
Oct. 30, 2014 (JP) .................................. 2014-221290

(51) Int. Cl.
*H01B 7/00* (2006.01)
*H02G 3/04* (2006.01)
(Continued)

(52) U.S. Cl.
CPC ....... *H01B 7/0045* (2013.01); *B60R 16/0207* (2013.01); *C09J 133/08* (2013.01);
(Continued)

(58) Field of Classification Search
CPC ......... B41J 2/01; B41M 5/00; B60R 16/0207; C08F 290/06; C08F 299/00; C08G 18/67;
(Continued)

(56) References Cited

U.S. PATENT DOCUMENTS

2007/0225448 A1\* 9/2007 Kudo ...................... C08L 57/04
525/329.7
2012/0214936 A1\* 8/2012 Fujita ..................... C09J 7/0246
524/548
2013/0034935 A1\* 2/2013 Matsumura ............. H01L 24/27
438/118

FOREIGN PATENT DOCUMENTS

JP   2003155455 A  *  5/2003  ............ C08F 220/18
JP   2004143233 A  *  5/2004  ............ C09J 175/16
(Continued)

OTHER PUBLICATIONS

International Search Report for PCT/JP2015/078709; 2 pages.

*Primary Examiner* — Timothy Thompson
*Assistant Examiner* — Guillermo Egoavil
(74) *Attorney, Agent, or Firm* — Reising Ethington, P.C.

(57) ABSTRACT

A wiring harness has a waterproof structure in which a waterproof agent covers a conductor exposed portion-and outer peripheral surfaces of end portions of wire covering members of a plurality of insulated wires in succession, the portion including a splice portion where portions of the
(Continued)

members of the insulated wires are removed and the exposed conductors are spliced together and a bundle of the exposed conductors of the insulated wires, the end portions being adjacent to the portion, whereby the portion is sealed with the waterproof agent, wherein the waterproof agent is a cured product of an ultraviolet curable adhesive agent that contains (A) an ester acrylate having a linear or branched C2-C12 alkyl group, (B) a (meth)acrylate compound comprising at least two urethane bonds in one molecule, and (C) a photopolymerization initiator.

7 Claims, 6 Drawing Sheets

(51) Int. Cl.
| | | |
|---|---|---|
| C09J 133/14 | (2006.01) | |
| C09J 133/08 | (2006.01) | |
| H01B 7/282 | (2006.01) | |
| H01B 3/42 | (2006.01) | |
| H01B 3/44 | (2006.01) | |
| H01R 4/70 | (2006.01) | |
| B60R 16/02 | (2006.01) | |

(52) U.S. Cl.
CPC ............ *C09J 133/14* (2013.01); *H01B 3/421* (2013.01); *H01B 3/443* (2013.01); *H01B 3/447* (2013.01); *H01B 7/282* (2013.01); *H01R 4/70* (2013.01)

(58) Field of Classification Search
CPC ...... C09D 11/00; C09D 11/322; C09J 7/0246; C09J 133/04; C09J 133/08; C09J 133/14; C09J 139/06; C09J 175/16; C09J 4/00; C09J 2201/622; C09J 2203/318; C09J 2433/00; H01B 7/0045; H01B 7/282; H01B 13/012; H01B 13/32; H01B 3/421; H01B 3/443; H01B 3/447; H01B 7/00; H01R 4/70; H01R 43/00; H02G 1/14
USPC .......................................... 174/72 A; 524/548
See application file for complete search history.

(56) References Cited

FOREIGN PATENT DOCUMENTS

| | | | |
|---|---|---|---|
| JP | 2008150502 A | 7/2008 | |
| JP | 2012046595 A | * 3/2012 | ............ C09D 11/00 |
| JP | 2013251166 A | 12/2013 | |

* cited by examiner

WIRE HARNESS

CROSS REFERENCE TO RELATED APPLICATIONS

This application claims the priority of Japanese patent application JP2014-221290 filed on Oct. 30, 2014, the entire contents of which are incorporated herein.

TECHNICAL FIELD

The present invention relates to wiring harnesses, and more particularly to wiring harnesses suitable for automobile use.

BACKGROUND ART

Wiring harnesses for automobile use are exposed to a high temperature environment during use. In addition, waterproof performance is required of splice portions in the wiring harnesses. It is known to apply an ultraviolet curable resin as a waterproof agent to waterproof portions of the splice portions of the wiring harnesses that are exposed to a high temperature environment (e.g., see Patent Document 1 Patent JP2013-251166).

SUMMARY

In the method described in Patent Document 1, an ultraviolet curable material containing a plasticizer is used. When the wiring harness is in a high temperature environment, there arises a problem in that the plasticizer contained in the wire covering members is transferred to the waterproof agent, and the waterproof agent is decreased in adhesive force to peel off from the wire covering members, resulting in unsatisfying waterproof performance. For this reason, the wiring harness could not obtain stable waterproof performance because the plasticizer of the wire covering members could vary in type, amount, and the like depending on the type of electric wires used in the wiring harness.

In addition, there arises another problem in that using a special expensive material as a waterproof agent in wiring harnesses could cause a remarkable increase of material costs and the like. Thus, it is required that an inexpensive material should be used as a waterproof agent in order not to increase the material cost of wiring harnesses.

The present design has been made to solve the above problems, and an object thereof is to provide a wiring harness capable of stably exhibiting, in a high temperature environment or the like, good waterproof performance of both of a wire covering member and a waterproof agent in a splice portion of the wiring harness even when the compositions of the wire covering members vary depending on the electric wires used in the wiring harness, while achieving a waterproof structure at low cost.

To achieve the objects and in accordance with the purpose of the present design, a wiring harness has a waterproof structure in which a waterproof agent covers a conductor exposed portion and outer peripheral surfaces of end portions of wire covering members of a plurality of insulated wires in succession in a conductor portion where portions of the wire covering members of the plurality of insulated wires are removed to expose the conductors, the conductor exposed portion including a bundle of the exposed conductors of the plurality of insulated wires and a splice portion where the conductors of the plurality of insulated wires are spliced together, the end portions of the wire covering members being adjacent to the conductor exposed portion, whereby the conductor exposed portion is sealed with the waterproof agent. The waterproof agent is a cured product of an ultraviolet curable adhesive agent that contains (A) an ester acrylate having a linear or branched C2-C12 alkyl group, (B) a (meth)acrylate compound having at least two urethane bonds in one molecule, and (C) a photopolymerization initiator. The content of (A) the ester acrylate having the linear or branched C2-C12 alkyl group is 20 to 70 mass % with respect to the total mass of curable compounds in the ultraviolet curable adhesive agent.

In the wiring harness, it is preferable that (A) the ester acrylate having the linear or branched C2-C12 alkyl group in the ultraviolet curable adhesive agent of the waterproof agent should be at least one kind selected from the group consisting of ethyl acrylate, isopropyl acrylate, n-butyl acrylate, isobutyl acrylate, n-pentyl acrylate, isopentyl acrylate, t-pentyl acrylate, n-octyl acrylate, isooctyl acrylate, 2-ethylhexyl acrylate, n-nonyl acrylate, isononyl acrylate, n-decyl acrylate, isodecyl acrylate, 2-propyl heptyl acrylate, and n-lauryl acrylate.

In the wiring harness, it is preferable that the ultraviolet curable adhesive agent of the waterproof agent should have a viscosity before cured within the range of 0.1 Pa·s to 30 Pa·s.

In the wiring harness, it is preferable that the wire covering members of the insulated wires should be made of a semi-hard or soft vinyl chloride resin containing a polyvinyl chloride and a plasticizer.

Since in the wiring harness, the waterproof agent is a cured product of an ultraviolet curable adhesive agent that contains (A) an ester acrylate having a linear or branched C2-C12 alkyl group, (B) a (meth)acrylate compound having at least two urethane bonds in one molecule, and (C) a photopolymerization initiator, and the content of (A) the ester acrylate having the linear or branched C2-C12 alkyl group is 20 to 70 mass % with respect to the total mass of the curable compounds in the ultraviolet curable adhesive agent, the wiring harness is capable of stably exhibiting, in a high temperature environment or the like, good waterproof performance of both of the wire covering members and the waterproof agent in the splice portion even when the compositions of the wire covering members vary depending on the electric wires used in the wiring harness, while achieving a waterproof structure at low cost.

The reason why the good waterproof performance is obtained by the above-described configuration is because of the following action. In wiring harnesses, electric wires get thinner as a plasticizer in wire covering members of the insulated wires reduce in a high temperature environment. Thus, peel stress is applied in the vertical direction on the water proof agent charged between the electric wires to create distortion. As a result, gaps and the like are likely to be formed between the electric wires and the waterproof agent. In order to solve this problem, an adhesive agent is additionally charged in gaps and the like formed as described above by using the ultraviolet curable adhesive agent having the above-described specific composition as a waterproof agent in the wiring harness. Thus, a wiring harness can be provided, which has a low-cost waterproof structure in which stickiness to the electric wires can be exhibited even after subjected to heat even when the compositions of the wire covering members vary depending on the electric wires used in the wiring harness.

In particular, since the ultraviolet curable adhesive agent of the waterproof agent contains the linear or branched C2-C12 ester acrylate as the component (A), the waterproof agent after curing can sufficiently exhibit stickiness. In addition, since the ultraviolet curable adhesive agent of the waterproof agent contains the (meth)acrylate compound having at least two urethane bonds in one molecule as the component (B), the waterproof agent after curing can be improved in strength, whereby stickiness required to maintain waterproof performance can be obtained.

In the wiring harness, the above-described components (A) to (C) in the ultraviolet curable adhesive agent used as the waterproof agent contain no expensive material such as a special polymer, which causes no remarkable increase of the material cost of the waterproof agent while achieving a waterproof structure at low cost.

DESCRIPTION OF EMBODIMENTS

Figure 1:
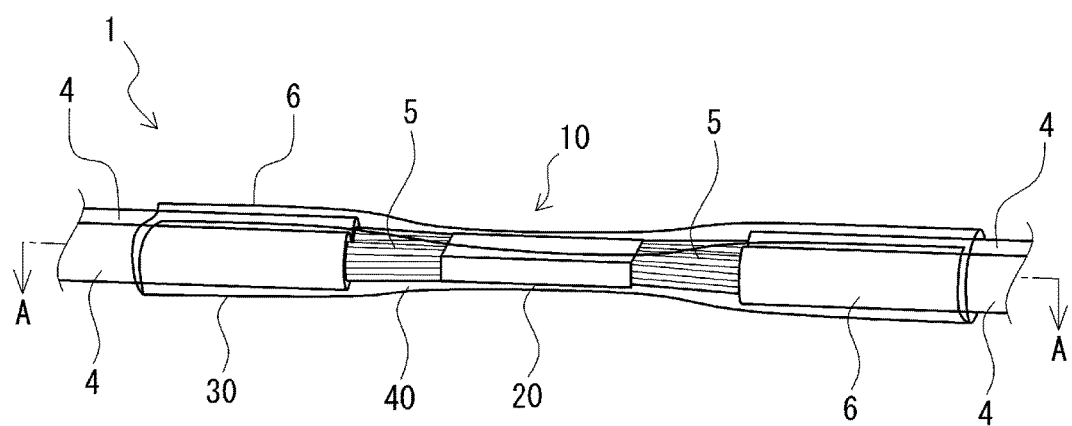
FIG. 1 is an external perspective view of a wiring harness according to one embodiment showing the vicinity of an intermediate splice portion.
Figure 2:
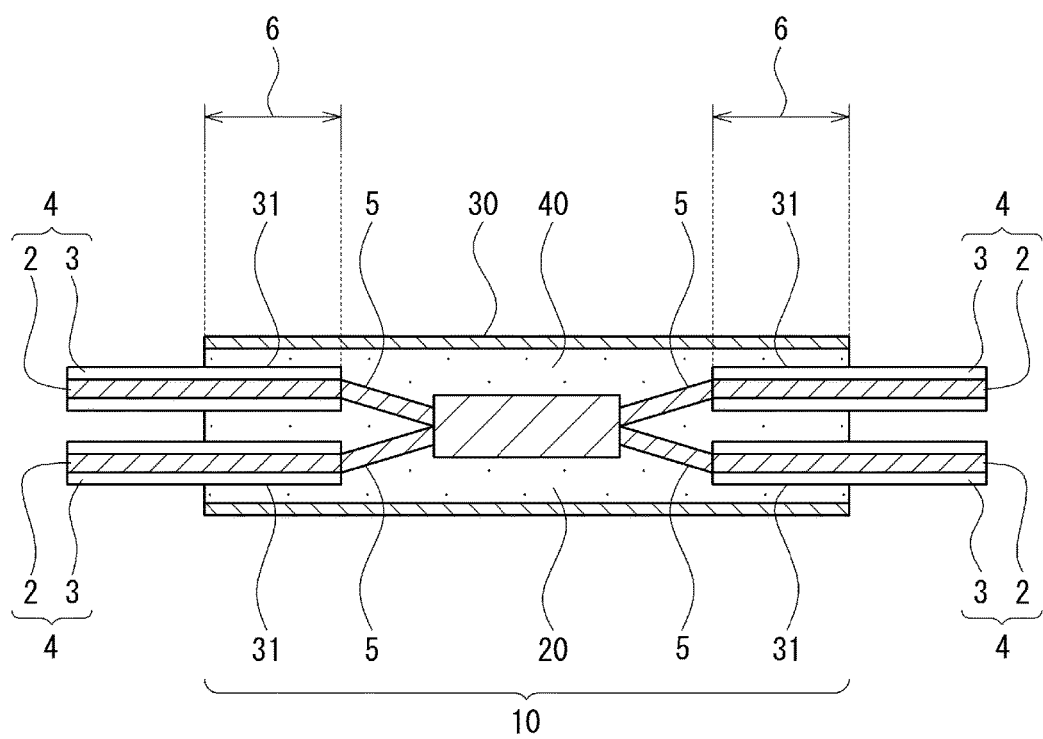
FIG. 2 is a horizontal sectional view taken along the line A-A of FIG. 1.

Hereinafter, detailed descriptions of one embodiment of the present design will be provided. FIG. 1 is an external perspective view of a wiring harness according to one embodiment showing the vicinity of an intermediate splice portion. FIG. 2 is a horizontal sectional view taken along the line A-A of FIG. 1. A wiring harness 1 according to the embodiment shown in FIGS. 1 and 2 includes a wire bundle of four insulated wires 4 made by covering conductors 2 made of core wires with wire covering members 3 made of insulators.

The wiring harness 1 includes, at an intermediate splice portion 20, a conductor exposed portion 5 where each of the wire covering members 3 of the plurality of insulated wires 4 of the wire bundle is partially peeled off and removed to expose a bundle of the conductors 2 inside the insulated wires 4. The conductors 2, 2, 2, and 2 of the plurality of insulated wires 4, 4, 4, and 4 are spliced together to form a splice portion, and the insulated wires 4 are electrically connected with one another at the conductor exposed portion 5. Being formed at the intermediate portion of the wire bundle, not at a terminal of the wire bundle, the above-described splice portion is referred to as the intermediate splice portion 20.

In the wiring harness 1, the intermediate splice portion 20 is covered with a waterproof agent 40, and the waterproof agent 40 is further covered with a protective sheet 30 to constitute a waterproof portion 10. The intermediate splice portion 20 of the waterproof portion 10 has a waterproof structure in which the waterproof agent 40 covers the conductor exposed portion 5 and covered portions 6 in succession. The conductor exposed portion 5 consists of the bundle of the exposed conductors of the plurality of insulated wires. The covered portions 6, which are adjacent to the conductor exposed portion 5, consist of end portions of the insulated wires. The waterproof agent 40 coves outer peripheral surfaces of the covering members 3 in the covered portions 6.

A cured product of an ultraviolet curable adhesive agent is used for the waterproof agent 40 of the waterproof portion 10. The ultraviolet curable adhesive agent contains at least the following components (A) to (C). Hereinafter, descriptions of the components will be provided.

(A) An ester acrylate having a linear or branched C2-C12 alkyl group (B) A (meth)acrylate compound having at least two urethane bonds in one molecule (C) A photopolymerization initiator The cured product of the ultraviolet curable adhesive agent has stickiness. It is considered that containing the ester acrylate having a linear or branched C2-C12 alkyl group of the above-described component (A), the ultraviolet curable adhesive agent can exhibit stickiness in the cured product after ultraviolet curing because the alkyl group that is a side chain component has high molecular mobility. On the other hand, if the ultraviolet curable adhesive agent contains an ester acrylate having a cyclic alkyl group or an ester acrylate having a ≥13C alkyl group instead of the above-described component (A), the ultraviolet curable adhesive agent can hardly obtain stickiness in the cured product after ultraviolet curing. This is thought to be caused by low molecular mobility in the ester acrylate having a bulky cyclic alkyl group, or caused by low molecular mobility un the ester acrylate having the ≥13C alkyl group that is high in crystallinity. Having stickiness, the waterproof agent can be prevented from being peeled off from an adherend when the wiring harness is used in a high temperature environment, whereby the waterproof performance can be maintained good.

In the composition of the ultraviolet curable adhesive agent, the content of the ester acrylate having the alkyl group of the component (A) is 20 to 70 mass % (hereinafter, referred to simply as %) with respect to the total mass of curable compounds in the composition. The curable compounds define a polymerizable component such as a monomer of the component (A) and a monomer of the component (B), and excludes a non-curable component such as a photopolymerization initiator. If the content of the component (A) is less than 20% with respect to the curable compounds, the stickiness to resist peeling is small, and thus the adhesive agent could not sufficiently exhibit waterproof performance required thereof. If the content of the component (A) is more than 70% with respect to the curable compounds, the material strength of the waterproof agent itself is small, and thus the waterproof agent could not sufficiently exhibit stickiness required thereof.

It is preferable for the ester acrylate having the linear or branched C2-C12 alkyl group of the component (A) to be ethyl acrylate, isopropyl acrylate, n-butyl acrylate, isobutyl acrylate, n-pentyl acrylate, isopentyl acrylate, t-pentyl acrylate, n-octyl acrylate, isooctyl acrylate, 2-ethylhexyl acrylate, n-nonyl acrylate, isononyl acrylate, n-decyl acrylate, isodecyl acrylate, 2-propyl heptyl acrylate, and n-lauryl acrylate. Among the above-described ester acrylates, a single kind of compound may be used alone, or two or more kinds of compounds may be used in combination.

Since the ultraviolet curable adhesive agent contains the (meth)acrylate compound of the component (B) that has at least two urethane bonds in one molecule, the material strength of the ultraviolet curable adhesive agent is improved to obtain stickiness required of the ultraviolet curable adhesive agent. It is to be noted that the term "(meth)acrylate" defines acrylate or methacrylate in the present invention. Examples of the above-described component (B) include a urethane (meth)acrylate oligomer.

The urethane (meth)acrylate oligomer is used as the base of a waterproof agent from the viewpoint of easy adjustment of waterproof properties, flexibility, adhesive properties, viscosity, and the like. The urethane (meth)acrylate oligomer defines a compound having a (meth)acryloyl group obtained by a reaction of a hydroxy (meth)acrylate and a compound obtained by a reaction of an isocyanate compound and a polyol compound (hydroxyl group-containing compound).

Examples of the urethane (meth)acrylate oligomer include a urethane acrylate obtained by a reaction of a bisphenol-A/ethylene-oxide-added diol, a diisocyanate, and a hydroxyalkylacrylate, a urethane acrylate obtained by a reaction of polytetramethylene glycol, a diisocyanate, and a hydroxyalkylacrylate, and a urethane acrylate obtained by a reaction of a diisocyanate and a hydroxyalkylacrylate. Among these oligomers, a single kind of oligomer may be used alone, or two or more kinds of oligomers may be used in combination.

Examples of the above-described diisocyanate include the following compounds: aliphatic isocyanates such as a methylene diisocyanate, an ethylene diisocyanate, a tetramethylene diisocyanate, a hexamethylene diisocyanate (HDI), a dodecamethylene diisocyanate, a 2,2,4-trimethylhexamethylene diisocyanate, a lysine diisocyanate (LDI), and a 1,3, 6-hexamethylene triisocyanate; alicyclic isocyanates such as a hydrogenated 4,4'-diphenylmethane diisocyanate (hydrogenated MDI), a hydrogenated-xylylene diisocyanate (hydrogenated XDI), a 1,4-cyclohexane diisocyanate, a hydrogenated 2,4-tolylene diisocyanate (hydrogenated TDI), an isophorone diisocyanate (IPDI), and a norbornene diisocyanate (NBDI); aromatic aliphatic isocyanates such as a xylylene diisocyanate (XDI) and a tetramethyl xylylene diisocyanate (TMXDI); and polyisocyanates such as aromatic isocyanates including a 1,4-diphenyl diisocyanate, a 2,4 or 2,6-tolylene diisocyanate (TDI), a 2,4 or 4,4-diphenyl methane diisocyanate (MDI), a 1,5-naphthalene diisocyanate (NDI), a 3,3'-dimethyl-4,4'-diphenylmethane diisocyanate, an o-tolidine diisocyanate, a polyphenyl methane polyisocyanate (crude MDI), a triphenylmethane triisocyanate, and a tris(isocyanate phenyl) thiophosphate. Among these diisocyanates, a single kind of diisocyanate may be used alone, or two or more kinds of diisocyanates may be used in combination.

Examples of the hydroxyl group-containing compound include 1-30C carbon chain alcohols having a hydroxy group at the terminal, (poly)ethylene glycol of a terminal diol, (poly) propylene glycol of a terminal diol, (poly) hexamethylene glycol of a terminal diol, a (poly)caprolactone of a terminal diol, a (poly)ester (poly)ol of a terminal diol, a (poly)amide of a terminal diol, and a (poly)ester of a terminal diol.

A metal-containing compound may be added to the urethane acrylate. The addition of the metal-containing compound improves curability for dark portions. As the metal-containing compound, those containing at least one kind of metal selected from the group consisting of tin, copper, zinc, cobalt, and nickel are preferred. The metal-containing compound is not limited particularly as long as a plurality of the above-described metals are contained in its constituent molecules in the form of metallic salt or metal complex, and conventionally known metal-containing compounds may be used.

Examples of the above-described metals in the form of metal salt include the above-described metals in the form of carboxylate, phosphate, sulfonate, hydrochloride, bromate, chlorate, perchlorate, and chlorite.

The above-described metal complex is not limited particularly as long as coordinated with an organic ligand capable of forming a coordination bond with the metal complex at 1:1 to 1:4 (metal:ligand) to be stabilized, and conventionally known metal complexes may be used.

Specific examples of—the metal-containing compound include bis(2,4-pentanedionato)tin, dibutyltin-bis(trifluoromethanesulfonate), dibutyltin diacetate, dibutyltin dilaurate, dibutyltin maleate, tin(IV) phthalocyanine dichloride, tetrabutylammonium difluorotriphenyltin, phthalocyanine tin(II), tributyl(2-pyridyl)tin, tributyl(2-thienyl)tin, tributyltin acetate, tributyl(trimethyl silylethynyl)tin, trimethyl(2-pyridyl)tin, bis(hexafluoroacetylacetonato)copper(II), bis(2,4-pentanedionato)copper(II), bis(1,3-propanediamine) copper(II) dichloride, bis(8-quinolinolato)copper(II), bis(trifluoro-2,4-pentanedionato)copper(II), bis(2-hydroxyethyl) dithiocarbamate copper(II), copper diethyldithiocarbamate, copper(II) dimethyldithiocarbamate, ethylenediaminetetraacetic acid disodium copper(II) salt, phthalocyanine copper(II), dichloro(1,10-phenanthroline)copper(II), copper phthalocyanine, tetra-4-tert-butylphthalocyanine copper, tetrakis(acetonitrile)copper(I) hexafluorophosphate, copper naphthenate, bis[2-(2-benzothiazolyl)phenolato]zinc(II), bis [2-(2-benzoxazolyl)phenolato]zinc(II), bis(2-hydroxyethyl) zinc(II) dithiocarbamate, bis(2,4-pentanedionato)zinc(II), bis(8-quinolinolato)zinc(II), bis(tetrabutylammonium)bis(1, 3-dithiol-2-thione-4,5-dithiolate)zinc complex, ethylenediaminetetraacetic acid disodium zinc salt, zinc(II) dibenzyldithiocarbamate, zinc(II) dibutyldithiocarbamate, zinc diethyldithiocarbamate, zinc dimethyldithiocarbamate, phthalocyanine zinc, zinc naphthenate, bis(cyclopentadienyl)cobalt(III) hexafluorophosphate, [1,1'bis(diphenylphosphino)ferrocene]cobalt(II) dichloride, bis(hexafluoroacetylacetonato)cobalt(II), (1R,2R)-N,N'-bis[3-oxo-2-(2,4, 6-trimethylbenzoyl) butylidene]-1,2-diphenylethylenediaminato cobalt(II), (1S,2S)-N,N'-bis[3-oxo-2-(2,4,6-trimethylbenzoyl) butylidene]-1,2-diphenylethylenediaminato cobalt(II), bis(2,4-pentanedionato)cobalt(II), bis(trifluoro-2,4-pentanedionato) cobalt(II), phthalocyanine cobalt(II), ethylenediaminetetraacetic acid disodium cobalt salt, hexaamminecobalt(III) chloride, N,N'-disalicylalethylenediamine cobalt(II), [5,10,15,20-tetrakis(4-methoxyphenyl) porphyrinato]cobalt(II), tris(2,4-pentanedionato)cobalt(III), cobalt naphthenate, [1,2-bis(diphenylphosphino)ethane] nickel(II) dichloride, bis (dithiobenzyl)nickel(II), bis (hexafluoroacetylacetonato)nickel(II), bis(2,4-pentanedionato)nickel(II), bis(tetrabutylammonium)bis (maleonitriledithiolato)nickel (II) complex, bis (tricyclohexylphosphine)nickel(II) dichloride, bis (triphenylphosphine)nickel(II) dichloride, bromo[(2,6-pyridinediyl)bis(3-methyl-1-imidazolyl-2-ylidene)]nickel bromide, ethylenediaminetetraacetic acid disodium nickel (II) salt, nickel(II) dibutyldithiocarbamate, and nickel diethyldithiocarbamate. Among these metal-containing compounds, a single kind of metal-containing compound may be used alone, or two or more kinds of metal-containing compounds may be used in combination.

(C) Photopolymerization Initiator

The photopolymerization initiator is not limited particularly as long as it is a compound to absorb ultraviolet light to initiate radical polymerization, and conventionally known photopolymerization initiators may be used.

Specific examples of the photopolymerization initiator include 1-hydroxycyclohexyl phenyl ketone, 2,2-dimethoxy-2-phenylacetophenone, xanthone, fluorenone, benzaldehyde, fluorene, anthraquinone, ethylanthraquinone, triphenylamine, carbazole, 3-methylacetophenone, 4-chlorobenzophenone, 4,4'-dimethoxy benzophenone, 4,4'-diamino benzophenone, Michler's ketone, benzoin propyl ether, benzoin ethyl ether, benzyl dimethyl ketal, 1-(4-isopropylphenyl)-2-hydroxy-2-methylpropan-1-one, 2-hydroxy-2-methyl-1-phenylpropan-1-one, thioxanthone, diethyl thioxanthone, 2-isopropyl thioxanthone, 2-chloro thioxanthone, 2-methyl-1-[4-(methylthio)phenyl]-2-morpholino-propan-1-one, 2,4,6-trimethylbenzoyl diphenylphosphine oxide, and bis-(2,6-dimethoxybenzoyl)-2,4,4-trimethyl pentyl phosphine oxide. Among these photopolymerization initiators, a single kind of photopolymerization initiator may be used alone, or two or more kinds of photopolymerization initiators may be used in combination.

Commercial products such as IRGACURE 184, 369, 651, 500, and 907, CGI1700, CGI1750, CGI1850, CG24-61; Darocure 1116, 1173, LucirinTPO (manufactured by BASF), and Ebecryl P36 (manufactured by UCB) can be used for the photopolymerization initiator.

A component other than the components (A) to (C) may be added to the composition of the ultraviolet curable adhesive agent within the range of not impairing the object of the present design such as the function as a waterproof agent. Examples of the other component include a (meth) acrylate monomer other than the above-described (meth) acrylate monomers, a stabilizer, a plasticizer, a softener, a pigment, a dye, an antistatic agent, a flame retardant, an adhesion-imparting agent, a sensitizer, a dispersant, a solvent, and an antibacterial antifungal agent.

Examples of the stabilizer include an antiaging agent, an antioxidant, and a dehydrating agent. Specific examples of them include a hindered phenol-based compound, a hindered amine-based compound (antiaging agents), butylhydroxytoluene, butylhydroxyanisole, a triphenyl phosphate (antioxidants), a maleic anhydride, a phthalic anhydride, a benzophenone tetracarboxylic dianhydride, calcined lime, a carbodiimide derivative, and an acid chloride such as stearyl chloride (dehydrating agents). In addition, a small amount of polymerization inhibitor such as methoquinone can be used as the stabilizer.

Examples of the plasticizer include dioctyl adipate, dibutyl sebacate, diethylhexyl sebacate, isodecyl succinate, diethylene glycol dibenzoate, a pentaerythritol ester, butyl oleate, methyl acetyl ricinolate, tricresyl phosphate, trioctyl phosphate, an adipic acid-propylene glycol polyester, an adipic acid-butylene glycol polyester, phenol, lauric acid, stearic acid, docosanoic acid, paraffinic oil, naphthenic oil, and aroma oil.

Examples of the pigment include an inorganic pigment such as titanium dioxide, zinc oxide, ultramarine, colcothar, lithopone, lead, cadmium, iron, cobalt, aluminum, a hydrochloride salt, and a sulfate salt, and an organic pigment such as an azo pigment and a copper phthalocyanine pigment.

Examples of the antistatic agent include a hydrophilic compound such as a quaternary ammonium salt, polyglycol, and an ethylene oxide derivative.

Examples of the flame retardant include chloroalkyl phosphate, dimethyl methyl phosphonate, a bromine/phosphorous compound, ammonium polyphosphate, neopentylbromide-polyether, and brominated polyether.

Examples of the adhesion-imparting agent include a terpene resin, a phenol resin, a terpene-phenol resin, a rosin resin, a xylene resin, and an epoxy resin.

Examples of the sensitizer include dimethylformamide, N-methylpyrrolidone, triethylamine, diethylamine, N-methyl diethanolamine, ethanolamine, 4-dimethylaminobenzoic acid, methyl 4-dimethylamino benzoate, ethyl 4-dimethylamino benzoate, isoamyl 4-dimethylamino benzoate, and commercial products such as Ebecryls P102, 103, 104, and 105 (manufactured by UCB).

Examples of the dispersant include a surfactant such as polyoxyethylene nonylphenyl ether and polyethylene glycol octylphenyl ether.

As the solvent, any solvent can be used as long as when a solid component is contained in the curable material composition, the solvent can dissolve the solid component. Specific examples of the solvent include a polar solvent such as tetrahydrofuran, dimethylformamide, ethyl acetate, and methyl ethyl ketone, and a chlorinated solvent such as dichloroethane and trichlorobenzene.

The waterproof agent is the ultraviolet curable adhesive agent irradiating with ultraviolet light to be cured. Visible light may also be used as well as ultraviolet light for the irradiation. A variety of conventionally known irradiation devices can be used for the ultraviolet irradiation. The conditions for the ultraviolet irradiation may be determined as appropriate in accordance with the ultraviolet curable material.

It is preferable that the ultraviolet curable adhesive agent should have a viscosity before cured within the range of 0.5 Pa·s to 30 Pa·s. The ultraviolet curable adhesive agent having the viscosity within the above-described range has a good balance between permeability of the waterproof agent into gaps among the conductors and a holding property to hold without falling down during the application, which allows both waterproof performance and workability. It is preferable that the ultraviolet curable adhesive agent should have a viscosity before cured within the range of 0.1 Pa·s to 30 Pa·s when the ultraviolet curable adhesive agent is used at the terminal splice portion shown in FIG. 6 to be described later.

In the wiring harness shown in FIGS. 1 and 2, the protective sheet 30 has flexibility to be deformable in accordance with the deformation of the surface of the waterproof agent 40. The protective sheet 30 covers the waterproof agent 40 in the state of being in intimate contact with the surface of the waterproof agent 40. The waterproof agent 40 is irradiated with ultraviolet light and cured in the state of being permeating the inside of the conductor exposed portion 5 of the insulated wires.

The waterproof agent 40 in the waterproof portion 10 is cured in the state of being in intimate contact with the surface of the wire covering members 3 of the insulated wires 4 adjacent to the conductor exposed portion 5. In the waterproof portion 10, the waterproof agent 40 covers the covered portions 6 that are in front and behind the conductors adjacent to the conductor exposed portion of the insulated wires 4. Since the waterproof agent 40 covers the covered portions 6 as described above, the entry of water from the gaps between the wire covering members 3 and the conductors 2 can be prevented.

In the wiring harness 1, it is preferable that the wire covering members 3 of the insulated wires 4 should be made of a semi-hard vinyl chloride resin or a soft vinyl chloride resin containing a polyvinyl chloride and a plasticizer, considering good properties and low cost can be achieved. Examples of the plasticizer include a phthalate ester plasticizer such as diisononyl phthalate (DINP), a trimellitate ester plasticizer such as tri-2-ethylhexyl trimellitate, an aliphatic dibasic acid ester plasticizer such as 2-ethylhexyl adipate and dibutyl sebacate, an epoxy plasticizer such as epoxidized soybean oil, and a phosphoric ester plasticizer such as tricresyl phosphate.

A single wire or a stranded wire of elemental wires made of copper, a copper alloy, aluminum, or the like is used for each of the conductors 2 of the insulated wires 4.

The intermediate splice portion 20 defines a portion where a wire covering member 3 is partially peeled off at the intermediate portion of an insulated wire 4 in the longitudinal direction to expose the conductor 2 inside the insulated wire 4, and the conductor 2 and a conductor 2 of another insulated wire 4 are spliced together. The conductor 2 of the another insulated wire 4 may be exposed at the intermediate portion of the insulated wire 4 in the longitudinal direction, or may be exposed at the terminal of the insulated wire 4. In the present description, the latter example will be explained. The number of the insulated wires 4 in the wiring harness 1 is not limited to four as long as a plurality of insulated wires are used.

In the intermediate splice portion 20, the splice of the conductors 2 can be made by means of welding such as resistance welding, ultrasonic welding, and laser welding. Alternatively, the splice of the conductors 2 in the intermediate splice portion 20 can be made in a method for crimping a part such as an intermediate crimp-style terminal onto the splice portion.

The protective sheet 30 covers the surface of the waterproof agent 40 in the state of being in intimate contact with the surface of the waterproof agent 40. The protective sheet 30 has permeability to irradiation light such as ultraviolet light used in curing the curable resin composition of the waterproof agent 40. The light permeability of the protective sheet 30 is preferably 50% or more in ultraviolet transmittance, and more preferably 90% or more in ultraviolet transmittance. The thickness of the protective sheet 30 is preferably 100 μm or less, and more preferably 5 to 50 μm.

A wrap sheet can be used as the protective sheet 30, the wrap sheet being made from an olefin-based resin such as a polyethylene, a polypropylene, a polyvinyl chloride, polyvinylidene chloride, and polyvinylidene fluoride, and a general-purpose resin wrap sheet such as a polyester, a polyethylene terephthalate, and a nylon. A sheet made from a polyvinyl chloride resin, a polyvinylidene chloride resin, or a polyvinylidene fluoride resin that are good especially in self-adhesiveness (i.e., stickiness) are preferred as the protective sheet 30.

Figure 3A:
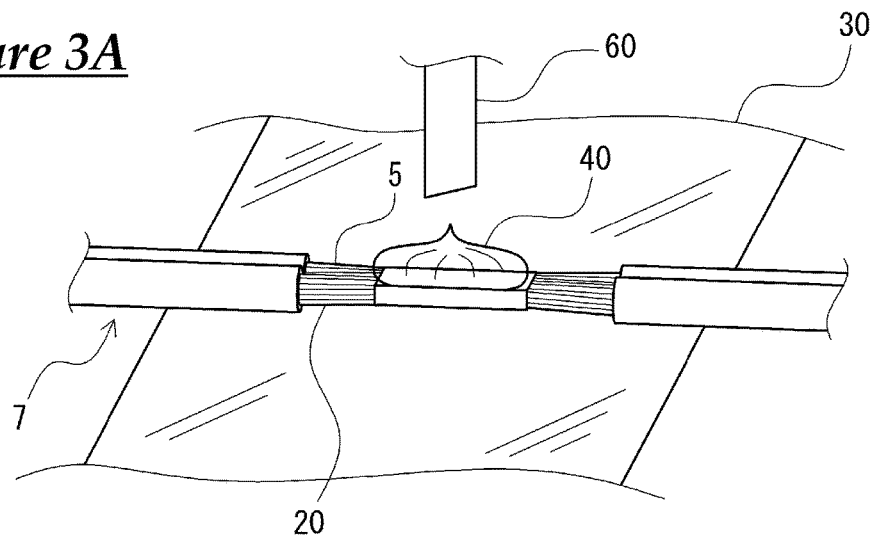
FIGS. 3A to 3C are explanatory drawings of the wiring harness showing the vicinity of the intermediate splice portion, and showing the steps of an example of a method for producing the wiring harness.
Figure 3B:
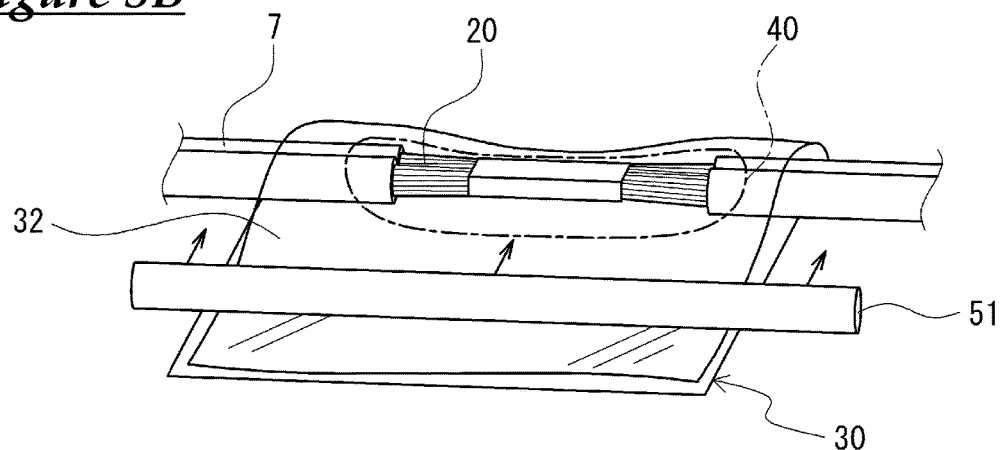
Figure 3C:
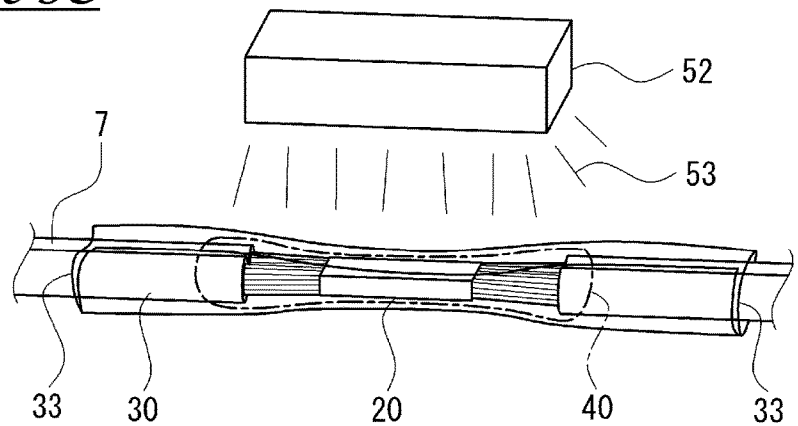

Hereinafter, a description of a method for producing the wiring harness shown in FIG. 1 will be provided. FIGS. 3A to 3C are explanatory drawings of the wiring harness showing the vicinity of the intermediate splice portion, and showing the steps of an example of a method for producing the wiring harness. As shown in FIG. 3A, a wire bundle 7 is first prepared, which has been prepared in advance by forming an intermediate splice portion 20 on a plurality of insulated wires. The wire bundle 7 includes the conductor exposed portion 5 where the wire covering members 3 of the insulated wires 4 are removed to expose the conductors 2 inside the insulated wires 4.

Next, as shown in FIG. 3A, a protective sheet 30 large enough to cover the intermediate splice portion 20 is prepared, and the intermediate splice portion 20 of the wire bundle 7 is placed on the protective sheet. Then, the waterproof agent is supplied on the intermediate splice portion 20. The waterproof agent 40 is supplied by being discharged by a predetermined amount from a nozzle 60 of a discharging device. The supply of the waterproof agent is carried out at normal temperature. It is also possible to place the wire bundle on the waterproof agent 40 after the waterproof agent is supplied on the protective sheet 30.

Next, as shown in FIG. 3B, the protective sheet 30 is folded such that the folded portion side of the protective sheet 30 wraps the intermediate splice portion 20 and the waterproof agent 40 while the protective sheet 30 is superimposed on itself at the section where there is no intermediate splice portion 20 and forms a superimposed portion 32. The superimposed portion 32 of the protective sheet 30 is kept superimposed by the self-adhesiveness of the protective sheet 30.

Next, the protective sheet 30 is wrapped on the surface of the waterproof agent 40 on the intermediate splice portion 20 to bring about a state where the waterproof agent 40 is charged into the protective sheet 30. After folding the protective sheet 30 into two, the superimposed portion 32 of the protective sheet 30 is squeezed with the use of a roll 51 to push in the waterproof agent 40 in the superimposed portion 32 toward the intermediate splice portion 20. Then, the superimposed portion 32 of the protective sheet 30 is wrapped around the waterproof portion 10 to be made to come into intimate contact therewith.

Next, as shown in FIG. 3C, the superimposed portion of the protective sheet 30 is wrapped around the intermediate splice portion 20 and the waterproof agent 40. The protective sheet 30 is wrapped under tension while being pulled, whereby the superimposed portion 32 of the protective sheet 30 is wrapped around the intermediate splice portion 20 and the waterproof agent 40 while the waterproof portion 10 is pressed from the outside of the protective sheet 30.

As a result, the waterproof agent 40 that exist locally around the intermediate splice portion 20 is extruded to spread between the outer peripheral portion of the intermediate splice portion 20 and the protective sheet 30, and covers the entire outer periphery of the intermediate splice portion 20. The protective sheet 30 is kept wrapped around the waterproof portion 10 by its self-adhesiveness. In addition, the waterproof portion 10 is kept pressed from the outside of the protective sheet 30.

Next, as shown in FIG. 3C, the intermediate splice portion 20 is irradiated with ultraviolet light 53 with the use of an ultraviolet irradiation device 52 while the protective sheet 30 is wrapped around the outer periphery of the intermediate splice portion 20 and the waterproof agent 40, whereby the waterproofing agent 40 is cured.

A light source such as a valve-type UV lamp filled with Hg, Hg/Xe, or a metal halide compound, and an LED-UV lamp can be used for the above-described ultraviolet irradiation device. The ultraviolet irradiation device may be a light condensation type UV irradiation device for condensing to emit the light from the above-described light source with the use of a reflection mirror.

Figure 4A:
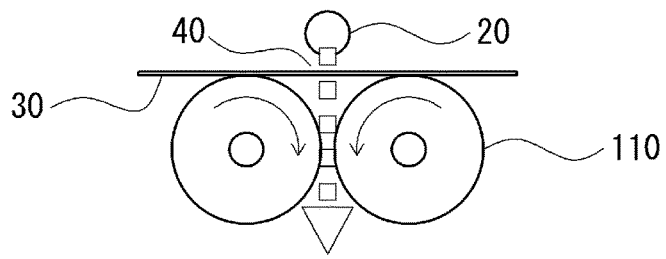
FIGS. 4A to 4E are explanatory drawings of the wiring harness showing the vicinity of the intermediate splice portion, and showing the steps of another example of a method for producing the wiring harness.

FIGS. 4A to 4E are explanatory drawings of the wiring harness according to the present design showing the vicinity of the intermediate splice portion, and showing the steps of another example of a method for producing the wiring harness according to the present design. In a method for wrapping the protective sheet 30 around the intermediate splice portion 20, a wrapping device can be used, which includes a pair of rollers 110 disposed in contact with each other, as shown in FIG. 4A. The wrapping device is configured to move the wire at both ends of the intermediate splice portion 20 downward while moving the wire along a pair of side grooves to make the intermediate splice portion 20 sandwiched by the pair of rollers 110 to move downward while rotating the pair of rollers 110. A description of the wrapping method using the wrapping device will be provided below.

First, as shown in FIG. 4A, the protective sheet 30 is placed on the top plate to supply the waterproof agent 40 on the protective sheet 30, and the intermediate splice portion 20 is placed on them.

Figure 4B:
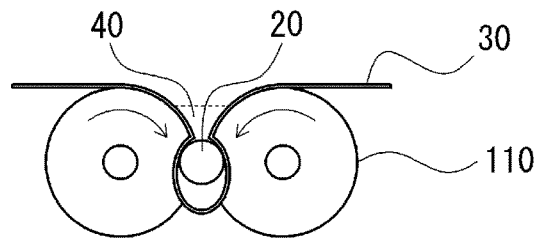
Figure 4C:
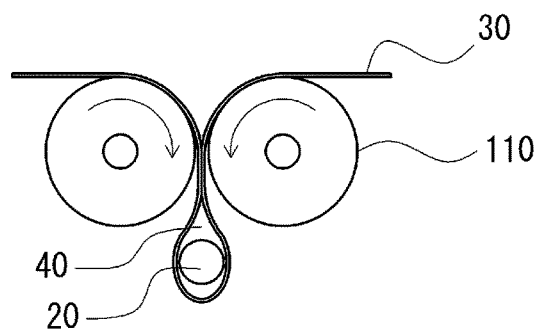

Next, as shown in FIG. 4B, the wire bundle is moved downward along the side grooves. While sandwiched by the protective sheet 30, the intermediate splice portion 20 is sandwiched between the pair of rollers 110. While elastically deformed in accordance with the shape of the peripheral portion of the intermediate splice portion 20, the pair of rollers 110 sandwich the intermediate splice 20, the waterproof agent 40, and the protective sheet 30. Thus, as shown in FIG. 4C, the protective sheet 30 is wrapped around the intermediate splice portion 20 and the waterproof agent 40 while a force is applied on the protective sheet 30.

Figure 4D:
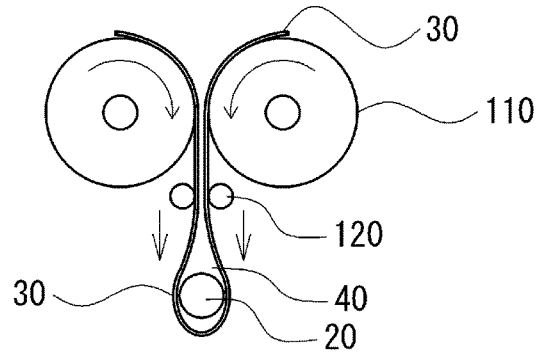
Figure 4E:
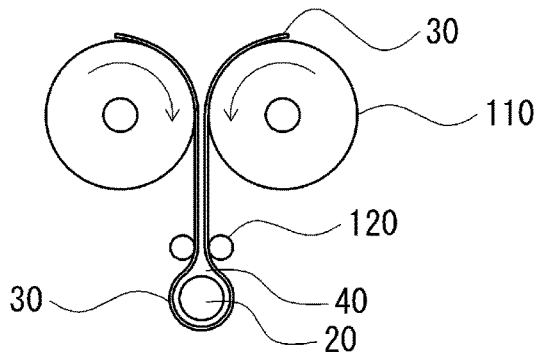

Next, as shown in FIG. 4D, while the intermediate splice portion 20 is sandwiched by the a pair of rod-like members 120, the rod-like members 120 are moved toward the intermediate splice portion 20. As shown in FIG. 4E, while the waterproof agent 40 is pressed from the outside of the protective sheet 30, the protective sheet 30 is wrapped on the surface of the waterproof agent 40. After the wrapping, the waterproof agent 40 is cured in the same manner as shown in FIG. 3C as described above.

The splice portion of the wiring harness is not limited to the above-described embodiment. That is, while the splice portion is provided in the middle of the wire bundle in the wiring harness of the above-described embodiment, the splice portion may be provided at the terminal of the wire bundle. In this case, a cup-shaped container, which is used in place of the protective sheet, is provided around the splice portion at the terminal to charge the waterproof agent thereinto, whereby a waterproof structure in that the conductor exposed portion of the terminal splice portion is sealed with the waterproof agent can be formed. Hereinafter, a description of the waterproof structure at the terminal splice portion will be provided.

Figure 5:
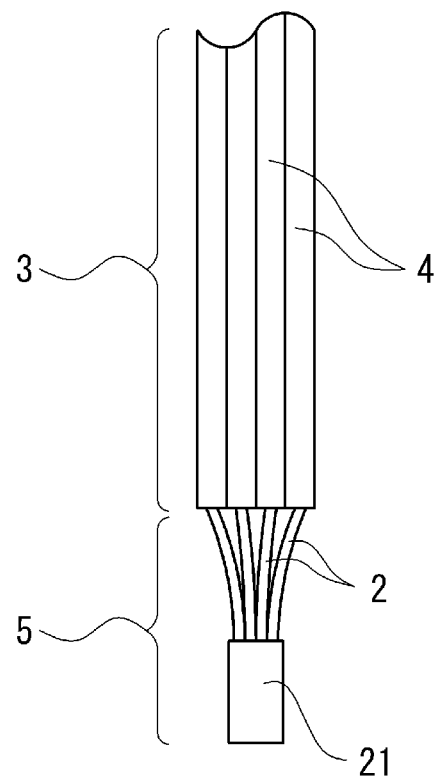
FIG. 5 is an explanatory drawing showing the outline of a wire bundle including a splice portion at its terminal.

FIG. 5 is an explanatory drawing showing the outline of a wire bundle including a splice portion at its terminal. The wire bundle shown in FIG. 5 includes, at its terminal, the conductor exposed portion 5 where the conductors 2 are exposed to the outside by peeling off the wire covering members 3 of the plurality of insulated wires 4. The conductor exposed portion 5 includes a terminal splice portion 21 where the terminals of the plurality of exposed conductors 2 are spliced together. The plurality of insulated wires 4 are electrically connected at the terminal splice portion 21. In the terminal splice portion 21, the splice of the conductors 2 can be made in a splicing method such as crimping (melting and crimping) and welding as in the case of the intermediate splice portion 20.

Figure 6:
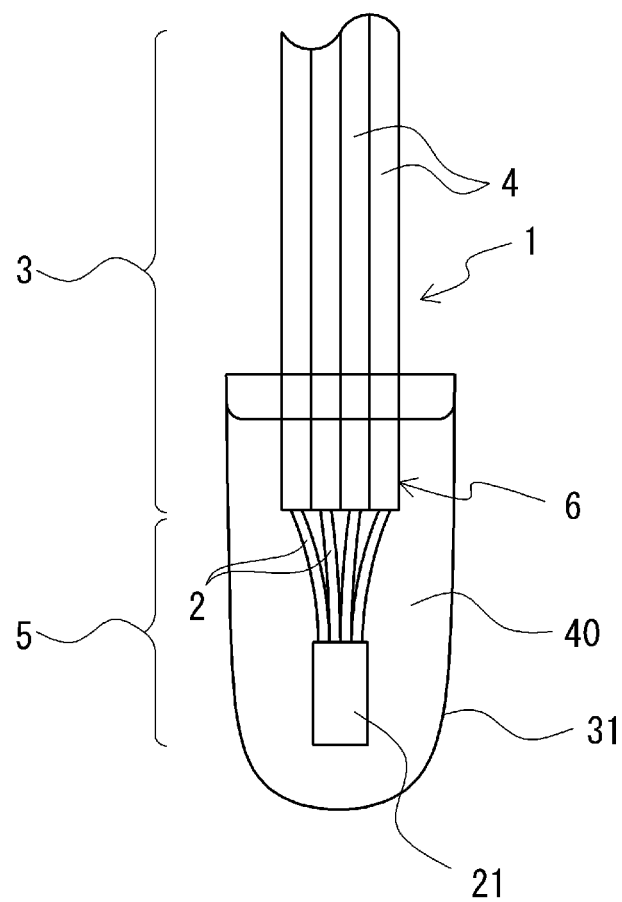
FIG. 6 is an explanatory drawing of a wiring harness according to another embodiment showing the vicinity of a terminal splice portion.

FIG. 6 is an explanatory drawing of a wiring harness according to another embodiment showing the vicinity of a terminal splice portion. In the wiring harness 1 shown in FIG. 6, the terminal splice portion 21 is included in a covered portion 6 that is covered with the waterproof agent 40 charged into a transparent container 31 made of a PVC cap. In the covered portion 6, the waterproof agent 40 covers the entire periphery of the conductor exposed portion 5 and the outer peripheral surfaces of the end portions of the wire covering members 3 adjacent to the conductor exposed portion 5, in succession. Thus, the wiring harness 1 has a waterproof structure in which the conductor exposed portion 5 and portions of the wire covering members 3 are sealed with the waterproof agent 40.

The wiring harness 1 shown in FIG. 6 is produced, for example, by charging an ultraviolet curable adhesive agent of the waterproof agent 40 into the transparent container 31, and then immersing the terminal splice portion 21 and the ends of the wire covering members 3 in the waterproof agent 40 in the container 31. Then, the ultraviolet curable adhesive agent is irradiated with ultraviolet light or the like from the side surface of the transparent container 31 to cure. Thus, the wiring harness 1 in which the covered portion 6 including the terminal splice portion 21 is sealed with the waterproof agent 40 is obtained.

The wiring harness according to the present design can be suitably used for a wiring harness for automobile use that is exposed to a high temperature environment during use, and waterproof performance is required of its splice portion.

EXAMPLES

A detailed description of the present design will be provided with reference to examples and comparative examples. It is to be noted that the present invention is not limited to these examples.

Examples 1 to 5 and Comparative Examples 1 to 5

The wiring harnesses according to Examples 1 to 5 and Comparative Examples 1 to 5 were produced by preparing ultraviolet curable adhesive agents having the component compositions shown in Table 1 and Table 2 and subjecting the splice portions of the wiring harnesses to a waterproof treatment using the prepared agents as waterproof agents. Then, the wiring harnesses were tested in terms of waterproof performance. The results of the tests are shown in Table 1 and Table 2. The details of the materials used in the ultraviolet curable adhesive agents of the waterproof agents shown in Table 1 and Table 2, a method for producing waterproof splice portions, waterproof test methods, and the like are as follows.

(1) Used Materials
(Meth)acrylate compound
NBA: n-butyl acrylate
HA: 2-ethylhexyl acrylate
IOA: isooctyl acrylate
IBA: isobornyl acrylate
CHA: cyclohexyl acrylate
GLM: glycidyl methacrylate
Urethane (meth)acrylate compounds (UA-1, UA-2)
PTMG: tetramethylene ether glycol (manufactured by MITSUBISHI CHEMICAL CORPORATION, a number-average molecular weight: 1000)
IPDI: isophorone diisocyanate (manufactured by TOKYO CHEMICAL INDUSTRY CO., LTD., a molecular weight: 222.29)
2-hydroxypropyl acrylate (manufactured by TOKYO CHEMICAL INDUSTRY CO., LTD., a molecular weight: 130.14)
UA-1 and UA-2 are urethane acrylates synthesized in the following method by urethanization reaction of the NCO terminals of a urethane prepolymer synthesized from PTMG and IPDI and the hydroxyl terminals of 2-hydroxypropyl acrylate.

A method for the synthesis of a urethane (meth)acrylate compound (UA-1)

500 g (500 mmol) of PTMG having a number-average molecular weight of 1000, 127 g (570 mmol) of IPDI, and 0.1 g of dibutyltin dilaurate were charged into a three-necked separable flask equipped with a stirrer, and the liquid temperature in the flask was raised from room temperature to 60 degrees C. over one hour while the liquid was being stirred. Then, a small amount of the liquid was sampled to measure the FT-IR, and the liquid was kept being stirred at 60 degrees C. while absorption of the isocyanate in the vicinity of 2300 cm$^{-1}$ was being checked. The content of the residual isocyanate groups was calculated based on the absorption area of the FT-IR. The time when the content was reduced to about 15% with respect to the content before the reaction and no more change was found was regarded as the termination of the reaction, and thus an NCO-terminated urethane prepolymer that is colorless transparent viscous liquid was obtained. 18.2 g (140 mmol) of 2-hydroxypropyl acrylate and 1.5 g of pentaerythritol tetrakis[3-(3,5-di-tert-butyl-4-hydroxyphenyl)propionate] were further added to the resulting urethane prepolymer, and the liquid temperature was raised from room temperature to 60 degrees C. over one hour while the liquid was being stirred. Then, a small amount of the liquid was sampled to measure the FT-IR, and the liquid was kept being stirred at 60 degrees C. while absorption of the isocyanate in the vicinity of 2300 cm$^{-1}$ was being checked. The content of the residual isocyanate groups was calculated based on the absorption area of the FT-IR. The time when the absorption disappeared was regarded as the termination of the reaction, and thus a diacrylate compound having acrylates at both terminals that is colorless transparent viscous liquid was obtained to be referred to as UA-1.

(UA-2)

500 g (500 mmol) of PTMG having a number-average molecular weight of 1000, 123 g (555 mmol) of IPDI, and 0.1 g of dibutyltin dilaurate were charged into a three-necked separable flask equipped with a stirrer, and the liquid temperature in the flask was raised from room temperature to 60 degrees C. over one hour while the liquid was being stirred. Then, a small amount of the liquid was sampled to measure the FT-IR, and the liquid was kept being stirred at 60 degrees C. while absorption of the isocyanate in the vicinity of 2300 cm$^{-1}$ was being checked. The content of the residual isocyanate groups was calculated based on the absorption area of the FT-IR. The time when the content was reduced to about 15% with respect to the content before the reaction and no more change was found was regarded as the termination of the reaction, and thus an NCO-terminated urethane prepolymer that is colorless transparent viscous liquid was obtained. 14.3 g (110 mmol) of 2-hydroxypropyl acrylate and 1.5 g of pentaerythritol tetrakis[3-(3,5-di-tert-butyl-4-hydroxyphenyl)propionate] were further added to the resulting urethane prepolymer, and the liquid temperature was raised from room temperature to 60 degrees C. over one hour while the liquid was being stirred. Then, a small amount of the liquid was sampled to measure the FT-IR, and the liquid was kept being stirred at 60 degrees C. while absorption of the isocyanate in the vicinity of 2300 cm$^{-1}$ was being checked. The content of the residual isocyanate groups was calculated based on the absorption area of the FT-IR. The time when the absorption disappeared was regarded as the termination of the reaction, and thus a diacrylate compound having acrylates at both terminals that is colorless transparent viscous liquid was obtained to be referred to as UA-2.

A photopolymerization initiator

Irgacure 184: manufactured by BASF SE, 1-hydroxy-cyclohexyl-phenyl-ketone

Irgacure 907: manufactured by BASF SE, 2-methyl-1-[4-(methylthio)phenyl]-2-(4-morpholinyl)-1-propanone (2) Physical Property Evaluation by a Holding Power Test (a Test to Evaluate Stickiness to Resist Peeling) for the Waterproof Agent JIS Z-0237 10.3.1 a) Samples were prepared to test under the following conditions in accordance with a procedure for testing stickiness to test panels. Adherend: While stainless steel plates are used in JIS Z-0237, plates (length 125 mm×width 50 mm×thickness 1.5 mm) made from the following materials of the resins used for a wire covering member of an insulated wire were used as adherends in the tests.

PVC: PVC plates containing 30 parts by mass of diisononyl phthalate (DINP) as a plasticizer PP: Plates of polypropylene (PP)

The compositions of the ultraviolet curable adhesive agents shown in Table 1 and Table 2 were irradiated with ultraviolet light under the following conditions to cure the compositions into a sheet shape to give sticky sheets. The sticky sheets were bonded to the adherends, and subjected to a peeling test at the initial stage and after subjected to a heat treatment for 10 days at 120 degrees C. to measure the stickiness.

Curing conditions: Irradiation with ultraviolet light for six seconds with the use of an LED 385 nm-UV irradiation machine (1000 mW/cm$^2$)

Tensile speed: 5 mm/sec

Test temperature: 23 degrees C.

(3) Waterproof Performance Evaluation (3-1) Preparation of a Waterproof Splice Portion (Preparation of a Waterproof Intermediate Splice Portion)

An intermediate splice workpiece was prepared that includes a PVC-covered wire having an outer diameter of 4.4 mm that contains 30 parts by mass of DINP as a main wire, and two PP-covered wires having an outer diameter of 3.6 mm as branch wires.

(Preparation of a waterproof terminal splice portion)

A terminal splice workpiece was prepared that includes two PVC-covered wires having an outer diameter of 4.4 mm that contain 30 parts by mass of DINP, and two PP-covered wires having an outer diameter of 3.6 mm, where the wire covering members at the terminals of the PVC-covered wires and the PP-covered wires were peeled off, and the PVC-covered wires and the PP-covered wires were spliced together at the terminals.

(3-2) Charging of the Adhesive Agent, and an Ultraviolet Curing Method (Waterproof Intermediate Splice Portion)

g of each of the above-described adhesive agents was applied in the middle of a transparent PVC wrap film that defines a protective sheet, and the intermediate splice portion of the splice workpiece was placed on it. Then, the PVC wrap film was bonded to squeeze, and the bonded PVC wrap film was further rolled so as to have the shape of covering the surfaces of the intermediate splice portion and the wire covering members about 15 mm long. Then, the adhesive agent was irradiated with ultraviolet light for six seconds with the use of an LED 385 nm-UV irradiation machine (1000 mW/cm$^2$) to cure.

(Waterproof Terminal Splice Portion)

1.5 g of each of the above-described adhesive agents was charged into a transparent PVC cap, and then the terminal splice workpiece was immersed in the adhesive agent in the cap. Then, the adhesive agent was irradiated with ultraviolet light for 12 seconds with the use of an LED 385 nm-UV irradiation machine (500 mW/cm$^2$) to cure.

(3-3) Evaluation of Waterproof Performance by a Pressure Test

In the pressure test, while each of the intermediate splice workpiece and the terminal splice workpiece was immersed in water, 150 kPa of air pressure was exerted for three minutes from the ends of the splice portions of all of the wires to observe the presence or absence of air leaks. The adhesive agent was evaluated as "good" when no air leaks were observed in both of the intermediate splice workpiece and the terminal splice workpiece that use the adhesive agent. The adhesive agent was evaluated as "poor" when air leaks were observed in either one or both of the intermediate splice workpiece and the terminal splice workpiece that use the adhesive agent while 150 kPa of air pressure was being exerted for three minutes. Evaluations of waterproof performance were conducted on both of the intermediate splice workpiece and the terminal splice workpiece both at the initial stages and after subjected to a heat treatment for 10 days in an atmosphere of 120 degrees C.

TABLE 1

| | | | Example | | | | |
|---|---|---|---|---|---|---|---|
| | | | 1 | 2 | 3 | 4 | 5 |
| Adhesive agent material composition (parts by mass) | | | | | | | |
| Ester acrylate compound | NBA | | 30 | 20 | 10 | — | — |
| | HA | | 30 | 50 | — | 5 | 20 |
| | IOA | | — | — | 10 | 15 | 40 |
| | IBA | | — | — | — | — | 10 |
| | CHA | | — | — | — | — | — |
| | GLA | | — | — | — | — | — |
| Urethane (meth)acrylate compound | UA-1 | | 40 | — | 80 | — | 10 |
| | UA-2 | | — | 30 | — | 80 | 30 |
| Photopolymerization initiator | Irgacure184 | | 1 | 1 | 1 | — | — |
| | Irgacure907 | | — | — | — | 1 | 1 |
| Evaluation result | | | | | | | |
| Peel adhesion (N/10 mm) | PVC | Initial stage | 20 | 21 | 15 | 18 | 18 |
| | | After heat treatment | 20 | 20 | 16 | 18 | 18 |
| | PP | Initial stage | 18 | 18 | 18 | 19 | 20 |
| | | After heat treatment | 20 | 18 | 18 | 18 | 19 |
| Waterproof performance | | Initial stage | good | good | good | good | good |
| | | After heat treatment | good | good | good | good | good |

TABLE 2

| | | | Comparative Example | | | | |
|---|---|---|---|---|---|---|---|
| | | | 1 | 2 | 3 | 4 | 5 |
| Adhesive agent material composition (parts by mass) | | | | | | | |
| Ester acrylate compound | NBA | | 10 | — | — | 20 | 15 |
| | HA | | — | 15 | — | 30 | 30 |
| | IOA | | — | — | — | — | 40 |
| | IBA | | — | 50 | 30 | 40 | — |
| | CHA | | 50 | — | — | — | — |
| | GLA | | — | — | 30 | — | — |
| Urethane (meth)acrylate compound | UA-1 | | 40 | — | 40 | — | 15 |
| | UA-2 | | — | 35 | — | — | — |
| Photopolymerization initiator | Irgacure184 | | 1 | 1 | 1 | — | — |
| | Irgacure907 | | — | — | — | 1 | 1 |
| Evaluation result | | | | | | | |
| Peel adhesion (N/10 mm) | PVC | Initial stage | 5 | 6 | 1 | 6 | 2 |
| | | After heat treatment | 5 | 2 | 1 | 5 | 1 |
| | PP | Initial stage | 4 | 3 | 1 | 4 | 1 |
| | | After heat treatment | 20 | 3 | 1 | 2 | 1 |
| Waterproof performance | | Initial stage | poor | poor | good | poor | poor |
| | | After heat treatment | poor | poor | poor | poor | poor |

As shown in Table 2, in the adhesive agent according to each of Comparative Examples 1 and 2, the content of the ester acrylate having a linear or branched C2-C12 alkyl group of the component (A) was equal to or less than the specified value, so that the adhesive agents according to Comparative Examples 1 and 2 were low in stickiness to resist peeling, and had poor waterproof performance.

The adhesive agent according to Comparative Example 3 did not contain the component (A), so that while being low in stickiness to resist peeling, the adhesive agent according to Comparative Example 3 had good waterproof performance at the initial stage as having adhesive properties by containing GMA and a urethane acrylate. However, the waterproof agent was peeled off from the adherend after the heat test, and thus had "poor" waterproof performance after the heat test.

The adhesive agent according to Comparative Example 4 did not contain (B) the (meth)acrylate compound of the component (B), so that while being viscous, the adhesive agent according to Comparative Example 4 was low in material strength to be unable to exhibit sufficient stickiness, and thus had "poor" waterproof performance from the initial stage.

In the adhesive agent according to Comparative Example 5, the content of the ester acrylate having an alkyl group of the component (A) was equal to or more than the specified value, so that while being viscous, the adhesive agent according to Comparative Example 5 was low in material strength to be unable to exhibit sufficient stickiness, and thus had "poor" waterproof performance from the initial stage.

In contrast, since each of the adhesive agents according to Examples 1 to 5 that define waterproof agents contained the ultraviolet curable adhesive agent that contained the ester acrylate of the component (A), the (meth)acrylate compound having at least two urethane bonds in one molecule of the component (B), and the photopolymerization initiator of the component (C), the adhesive agents according to Examples 1 to 5 could exhibit stickiness, and maintain waterproof performance both at the initial stages and after subjected to a heat treatment for 10 days at 120 degrees C.

While the embodiments of the present design have been described in detail, the present invention is not limited to the above-described embodiments, and various modifications can be made without departing from the gist of the present invention.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A wiring harness comprising a waterproof structure in which a waterproof agent covers a conductor exposed portion and outer peripheral surfaces of end portions of wire covering members of a plurality of insulated wires in succession in a conductor portion where portions of the wire covering members of the plurality of insulated wires are removed to expose the conductors, the conductor exposed portion comprising a bundle of the exposed conductors of the plurality of insulated wires and a splice portion where the conductors of the plurality of insulated wires are spliced, the end portions of the wire covering members being adjacent to the conductor exposed portion, whereby the conductor exposed portion is sealed with the waterproof agent, wherein the waterproof agent comprises a cured product of an ultraviolet curable adhesive agent that comprises (A) an ester acrylate having a linear or branched C2-C12 alkyl group, (B) a (meth)acrylate compound comprising at least two urethane bonds in one molecule, and (C) a photopolymerization initiator, wherein the content of (A) the ester acrylate having the linear or branched C2-C12 alkyl group is 20 to 70 mass % with respect to the total mass of curable compounds in the ultraviolet curable adhesive agent, and wherein the cured product has stickiness.

2. The wiring harness according to claim 1, wherein (A) the ester acrylate having the linear or branched C2-C12 alkyl group in the ultraviolet curable adhesive agent of the waterproof agent comprises at least one kind selected from the group consisting of ethyl acrylate, isopropyl acrylate, n-butyl acrylate, isobutyl acrylate, n-pentyl acrylate, isopentyl acrylate, t-pentyl acrylate, n-octyl acrylate, isooctyl acrylate, 2-ethylhexyl acrylate, n-nonyl acrylate, isononyl acrylate, n-decyl acrylate, isodecyl acrylate, 2-propyl heptyl acrylate, and n-lauryl acrylate.

3. The wiring harness according to claim 2, wherein the ultraviolet curable adhesive agent of the waterproof agent has a viscosity before cured within the range of 0.1 Pa·s to 30 Pa·s.

4. The wiring harness according to claim 3,
wherein the wire covering member of at least one insulated wire among the plurality of insulated wires comprises a semi-hard or soft vinyl chloride resin comprising a polyvinyl chloride and a plasticizer.

5. The wiring harness according to claim 2,
wherein the wire covering member of at least one insulated wire among the plurality of insulated wires comprises a semi-hard or soft vinyl chloride resin comprising a polyvinyl chloride and a plasticizer.

6. The wiring harness according to claim 1, wherein the ultraviolet curable adhesive agent of the waterproof agent has a viscosity before cured within the range of 0.1 Pa·s to 30 Pa·s.

7. The wiring harness according to claim 1,
wherein the wire covering member of at least one insulated wire among the plurality of insulated wires comprises a semi-hard or soft vinyl chloride resin comprising a polyvinyl chloride and a plasticizer.

* * * * *